US011745081B2

(12) United States Patent
Gibson et al.

(10) Patent No.: US 11,745,081 B2
(45) Date of Patent: Sep. 5, 2023

(54) UNIVERSAL SCREEN STAND FOR STATIONARY EXERCISE MACHINES

(71) Applicant: Mad Dogg Athletics, Inc., Venice, CA (US)

(72) Inventors: Ronald Gibson, Santa Clarita, CA (US); John Baudhuin, Santa Monica, CA (US); John Cook, Venice, CA (US)

(73) Assignee: Mad Dogg Athletics, Inc., Venice, CA (US)

( * ) Notice: Subject to any disclaimer, the term of this patent is extended or adjusted under 35 U.S.C. 154(b) by 82 days.

(21) Appl. No.: 17/327,017

(22) Filed: May 21, 2021

(65) Prior Publication Data
US 2022/0008804 A1 Jan. 13, 2022

Related U.S. Application Data

(60) Provisional application No. 63/028,525, filed on May 21, 2020.

(51) Int. Cl.
*A63B 71/06* (2006.01)
*A63B 22/06* (2006.01)
*F16M 11/06* (2006.01)
*F16M 11/28* (2006.01)

(52) U.S. Cl.
CPC ...... *A63B 71/0619* (2013.01); *A63B 22/0605* (2013.01); *F16M 11/06* (2013.01); *F16M 11/28* (2013.01); *A63B 2071/0658* (2013.01); *A63B 2225/093* (2013.01)

(58) Field of Classification Search
CPC . A63B 22/06; A63B 22/0605; A63B 71/0619; A63B 71/0622; A63B 2071/0658; A63B 2225/093; F16M 11/06; F16M 11/28
USPC ........................................................ 248/125.9
See application file for complete search history.

(56) References Cited

U.S. PATENT DOCUMENTS

| 7,311,640 | B2 * | 12/2007 | Baatz ..................... | A63B 24/00 482/4 |
| 7,481,749 | B1 * | 1/2009 | Chen ..................... | A63B 21/225 482/64 |
| 7,491,154 | B2 * | 2/2009 | Yonehana .......... | G09B 19/0038 434/61 |
| 7,762,931 | B2 * | 7/2010 | Fisher ................ | A63B 22/0605 297/215.14 |
| 8,951,168 | B2 * | 2/2015 | Baudhuin .............. | G16H 40/20 482/8 |
| 9,233,277 | B1 * | 1/2016 | Krull ...................... | A63B 26/00 |
| 9,724,589 | B2 * | 8/2017 | Baudhuin .............. | G16H 20/30 |
| 10,702,736 | B2 * | 7/2020 | Weston .............. | A63B 22/0605 |
| 11,220,832 | B2 * | 1/2022 | Meynelly ........... | A61H 33/6005 |
| 2003/0181293 | A1 * | 9/2003 | Baatz ..................... | A63B 24/00 482/63 |
| 2009/0118099 | A1 * | 5/2009 | Fisher ................ | A63B 21/0052 482/5 |

(Continued)

*Primary Examiner* — Nkeisha Smith
(74) *Attorney, Agent, or Firm* — WPAT LAW, P.C.; Anthony King

(57) ABSTRACT

A screen stand to retrofit onto a stationary exercise machine using existing bolts on the stationary exercise machine. The screen stand has a hollow top mast slidably received within a hollow bottom mast. The bottom mast has a first anchor to attach to the pop pin of the stationary bicycle. There is a second anchor that attaches to the front stabilizer bar of the stationary bicycle.

10 Claims, 5 Drawing Sheets

(56) References Cited

U.S. PATENT DOCUMENTS

2022/0280856 A1* 9/2022 Baker ................ A63B 71/0619

* cited by examiner

UNIVERSAL SCREEN STAND FOR STATIONARY EXERCISE MACHINES

CROSS-REFERENCE TO RELATED APPLICATIONS

This application claims priority to, and is a non-provisional of, U.S. Provisional Patent Application No. 63/028,525, filed on May 21, 2020, which is hereby incorporated by reference in its entirety.

Although incorporated by reference in its entirety, no arguments or disclaimers made in the parent application apply to this divisional application. Any disclaimer that may have stated in the above-referenced application is hereby expressly rescinded.

FIELD OF THE DISCLOSURE

The present disclosure relates to an accessory to a stationary exercise machine, more specifically, a universal screen stand mountable onto a stationary bike.

BACKGROUND OF THE DISCLOSURE

Covid-19 has changed the fitness industry and increased the need for standalone pieces of exercise equipment that can be properly distanced for the health and safety of health club members. The number of bikes in dedicated indoor cycling rooms is being reduced and the bikes that are being taken out to address social distancing are left unused and underutilized.

Currently, for a gym operator to offer an indoor cycling bike with a dedicated screen, it is necessary to purchase an entirely new bike which can be costly. Therefore, there is a need for a sturdy screen mount that can retrofit onto existing indoor cycling bikes to convert them into connected bikes with screens a lower cost than purchasing a new bike.

There is now a need to cost-effectively convert indoor cycling bikes into dedicated indoor cycling bikes with a screen to accommodate coaching whereby the bikes can be positioned elsewhere within a facility to accommodate proper distancing.

Some known indoor cycling bikes has screens anchored to the handlebar. The challenge with screens anchored on handlebars is that the weight of the screen makes it hard to adjust the handlebar height and/or fore-aft position. Additionally, a bar-mounted screen tends to shake as the rider shifts their weight from side to side from the right to the left pedal as well as back and forth from the right side of the handlebars to the left side of the handlebars.

There remains a need for a way to securely anchor a screen to an indoor cycling bike.

The herein disclosed embodiments may seek to satisfy one or more of the above-mentioned needs. Although the present embodiments may obviate one or more of the above-mentioned needs, it should be understood that some aspects of the embodiments might not necessarily obviate them.

BRIEF SUMMARY OF THE DISCLOSURE

In a general implementation, a screen stand capable of retrofitting or mounting onto a stationary exercise machine.

In one aspect combinable with the general implementation, the stationary exercise machine can be an upright stationary bicycle.

In one aspect combinable with the general implementation, the stationary exercise machine can be a recumbent stationary bicycle.

In one aspect combinable with the general implementation, the stationary exercise machine can be an elliptical machine.

In one aspect combinable with the general implementation, the stationary exercise machine can be a stair-climber.

In one aspect combinable with the general implementation, the stationary exercise machine can be a dual action stationary bicycle.

In one aspect combinable with the general implementation, the stationary exercise machine can be a rowing machine.

In another aspect combinable with the general implementation, the screen stand can have a mast and a mounting bracket. The mounting bracket is contemplated for attaching a monitor.

In another aspect combinable with the general implementation, the mounting bracket can be disposed near a top end of the mast.

In another aspect combinable with the general implementation, the mounting bracket can be attached to the mast via a joint, and the joint may provide a pivoting and/or swiveling movement for the mounting bracket relative to the mast.

In another aspect combinable with the general implementation, there can be a first anchor coupled to the mast, and the first anchor can have a first attachment point to attach to the stationary exercise machine.

In another aspect combinable with the general implementation, there can be a second anchor coupled to the mast at a location below the first anchor. The second anchor can have a second attachment point to attach to the stationary exercise machine.

In another aspect combinable with the general implementation, the mast can have a top mast and a bottom mast. The top mast can slidably attach to the bottom mast and can allow the mast to change its length.

In another aspect combinable with the general implementation, the mast can have a hollow interior, or the mast can be made of a hollow tube or hollow structure.

In another aspect combinable with the general implementation, there can be one or more cables (e.g., data transmission cables, internet cables, coaxial cables, networking cables) preassembled within the hollow interior of the mast.

In another aspect combinable with the general implementation, there can be one or more power cords (e.g., power cord of the monitor) preassembled within the hollow interior of the mast.

In another aspect combinable with the general implementation, the mast can have a top opening and a bottom opening.

In another aspect combinable with the general implementation, the top terminal end of the cable and/or power cord can be preassembled to extend through the top opening of the mast thereby allowing user access to them.

In another aspect combinable with the general implementation, the bottom terminal end of the cable and/or power cord can be preassembled to extend through the bottom opening of the mast thereby allowing user access to them.

In another aspect combinable with the general implementation, the cables and/or power cords that are preassembled in the hollow interior of the mast can have connectors attached to their bottom terminal ends thereby allowing their electrical extension coupling to another cable and/or another power cord.

In another aspect combinable with the general implementation, the first attachment point of the screen stand can be attached to a pop pin of the stationary exercise machine. In this way, no additional drilling is required to attach the first attachment point to the stationary exercise machine.

In another aspect combinable with the general implementation, the second attachment point can be attached to existing bolts on the stabilizer bar of the stationary exercise machine. In this way, no additional drilling is required to attach the second attachment point to the stationary exercise machine.

In another aspect combinable with the general implementation, when the second attachment point is attached to the stationary exercise machine, the bottommost portion of the screen stand can have a distance from the ground and does not make any physical contact with the ground.

While this specification contains many specific implementation details, these should not be construed as limitations on the scope of any inventions or of what may be claimed, but rather as descriptions of features specific to particular implementations of particular inventions.

Although features may be described above and below as acting in certain combinations and even initially claimed as such, one or more features from a claimed combination can in some cases be excised from the combination, and the claimed combination may be directed to a subcombination or variation of a subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
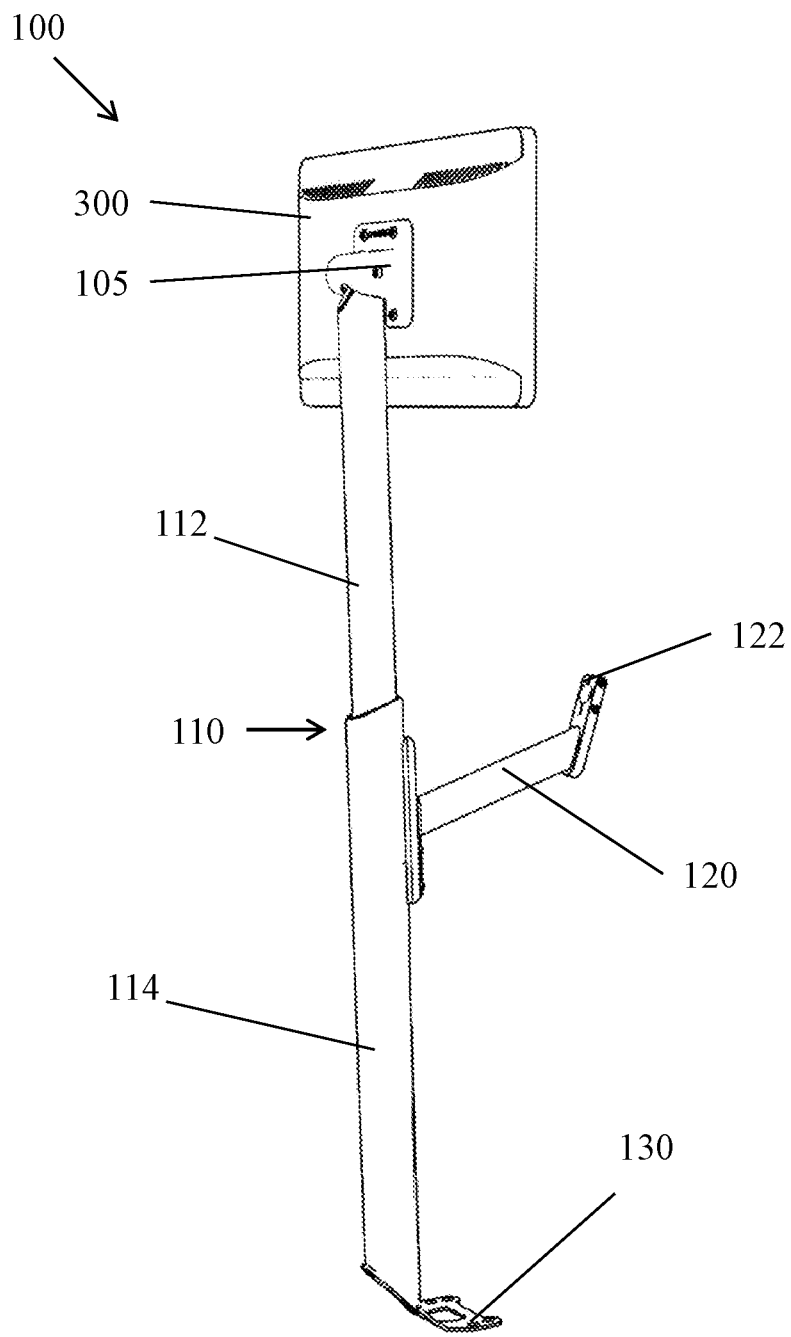
FIG. 1 is a perspective view of a contemplated screen stand having an electronic display mounted thereon, according to one aspect of the embodiments.

The following call-out list of elements in the drawing can be a useful guide when referencing the elements of the drawing figures:

100 Screen Stand
103 Joint
105 Mounting Bracket
106 Fastener
110 Mast
112 Top Mast
114 Bottom Mast
120 First Anchor
122 First Attachment Point
130 Second Anchor
132 Second Attachment Point
134 Plate
136 Fastener
150 Bundle of Cables
152 Connector
154 Connector
200 Stationary Bike
201 Front Stabilizer Bar
202 Transport Wheel
204 Pop Pin
205 Handle Post
206 Fly Wheel
207 Fork
300 Monitor

DETAILED DESCRIPTION OF THE EMBODIMENTS

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below.

The inventor has discovered a novel method and novel screen stand 100 or monitor mount that can readily turn a typical stationary exercise machine into a media-rich, content-rich, "connected" exercise equipment that can allow the user to see/experience content, metrics, entertainment, social engagement and communication.

The contemplated hardware can be a screen stand 100 with all the electronics and cables 150 preassembled into the screen stand 100. By having all electronics and cables 150 preassembled, a user can now easily connect stationary exercise machine to a network with ease. This can also be an easy solution to upgrade existing stationary exercise equipment to "connected" equipment having an electronic display.

As used herein, the term "electronic display" or "screen" in conjunction with the mounting bracket refers to any known electronic device of various dimensions having a displaying means. For example, it can be a computer monitor, an electronic tablet, an IPAD, a cellular phone, and a television.

Referring now to FIG. 1, the contemplated screen stand 100 can have a mast 110 to hold up a monitor 300. There can be a bracket 105 disposed near or at the top end of the mast 110, and the monitor 300 can be fastened to the bracket 105.

The mast 110 can come in two pieces, the top mast 112 and the bottom mast 114. The top mast 112 can slidably receive within the bottom mast 114 thereby creating a telescoping mast 110. In this way, the height of the monitor 300 can be adjusted according to the needs of the user.

As will be discussed in more details below, the contemplated screen stand 100 can be easily fastened onto a stationary exercise machine, such as a stationary bicycle 200 shown in the examples of FIGS. 2-4.

The bottom mast 114 can have a first anchor 120 to attach to the stationary bicycle 200. The first anchor 112 can be an arm piece extending from the bottom mast 114. The embodiment shown in FIG. 1 provides a first anchor 120 in the form of a straight rigid arm coupled to the mid-portion of the mast 110, or coupled to the top portion of the bottom mast 114. In some embodiments, the first anchor 120 is a rigid arm that does not have any telescoping functions. In some other embodiments, the first anchor 120 can have a telescoping function.

At the distal end of the first anchor 120 there can be a first attachment point 122. The first attachment point 122 is the contact surface where the anchor 120 makes physical connection with the stationary bicycle 200. In one contemplated embodiment, the first attachment point 122 can be a plate having a through hole as shown in FIG. 1. The plate can be correspondingly angled to match the angle of the handle post 205 (see FIGS. 2, 3) so that the plate can seamlessly assemble onto the handle post 205 of the stationary bicycle 200. As shown in FIGS. 2-4, the pop pin 204 of the stationary bicycle 200 inserts through the through hole of the plate and secures the first attachment point 122 onto the handle post 205.

At or near the bottom end of the bottom mast 114 there can be a second anchor 130. As will be described in more details later, the second anchor 130 can secure onto the front stabilizer bar 201 of the stationary bicycle 200 using existing bolts of the front stabilizer bar 201, thereby making a seamless integration onto the stationary bicycle 200.

Although standalone television stands are known in the art in a conference room or living room setting for people to watch television from a distance, a monitor 300 for a stationary bicycle 200 needs to be positioned close enough to the rider to allow the touch-screen to be accessed without the rider straining to reach the screen 300, a situation that could cause the rider to lose balance. Screens 300 on prior art standalone stands are difficult to position close enough to the rider to allow the rider to access the touch screen. Additionally, screens 300 on prior art standalone stands may tip over causing harm to the rider or bystanders as well as the screen itself. Prior art standalone stands require a large base or a heavy base that is difficult to securely anchor. In addition, prior art standalone screen stand that is placed in front of the stationary bicycle 200 can create undesirable clutter due to the expose power cords, wires and cables. Further, when the user needs to move the stationary bicycle 200 in the prior art, the user must move the stationary bicycle 200 and the standalone screen stand independently. In a commercial or home setting where the stationary bicycle may need to be frequently moved to clean underneath or to adjust to a class size, moving and then rearranging these separate pieces of standalone screen stands and stationary bicycles 200 can be quite labor intensive.

Figure 2:
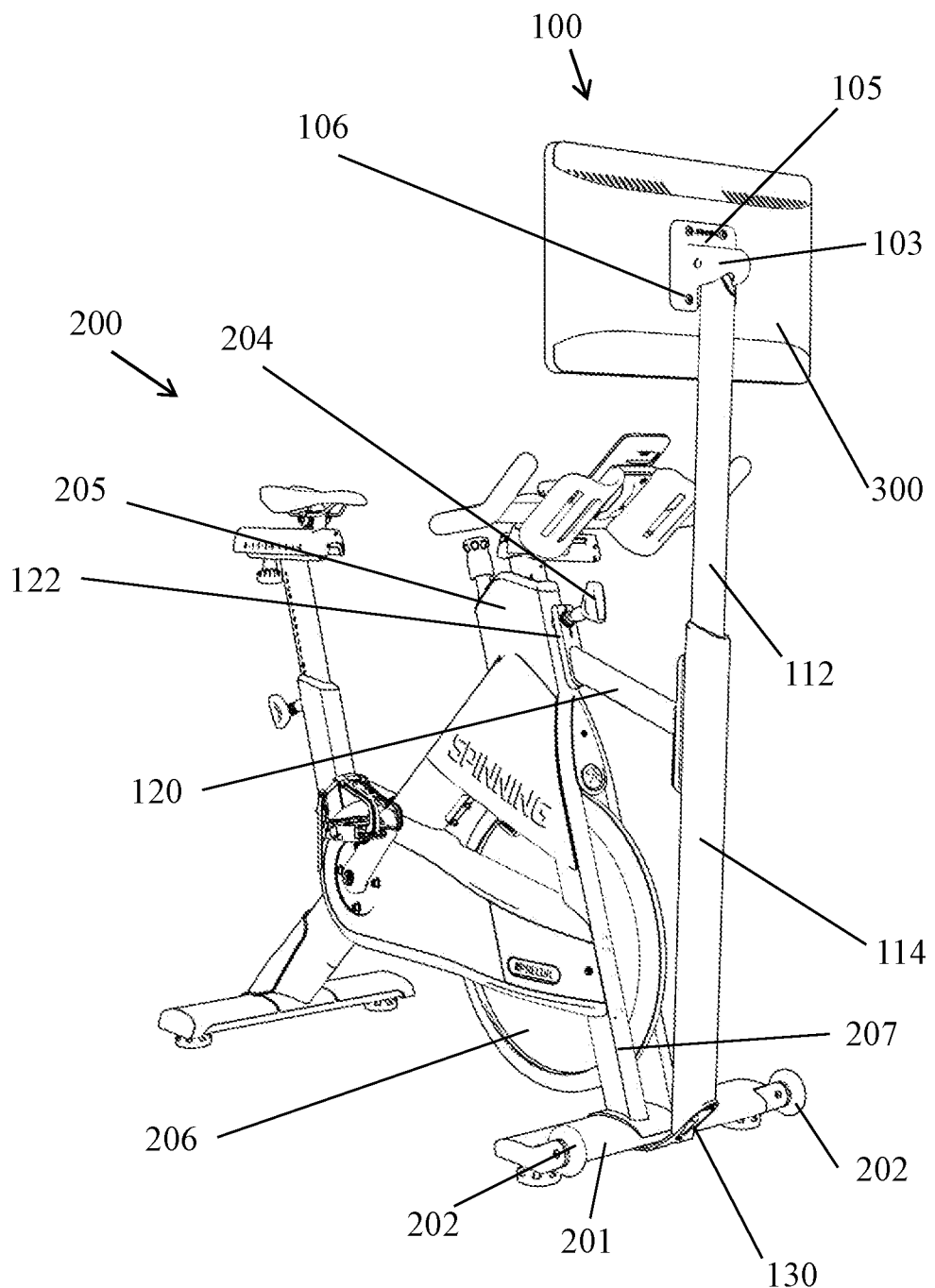
FIG. 2 is a perspective view of a contemplated screen stand having an electronic display mounted thereon, wherein the screen stand is mounted onto a stationary bike, according to one aspect of the embodiments.
Figure 3:
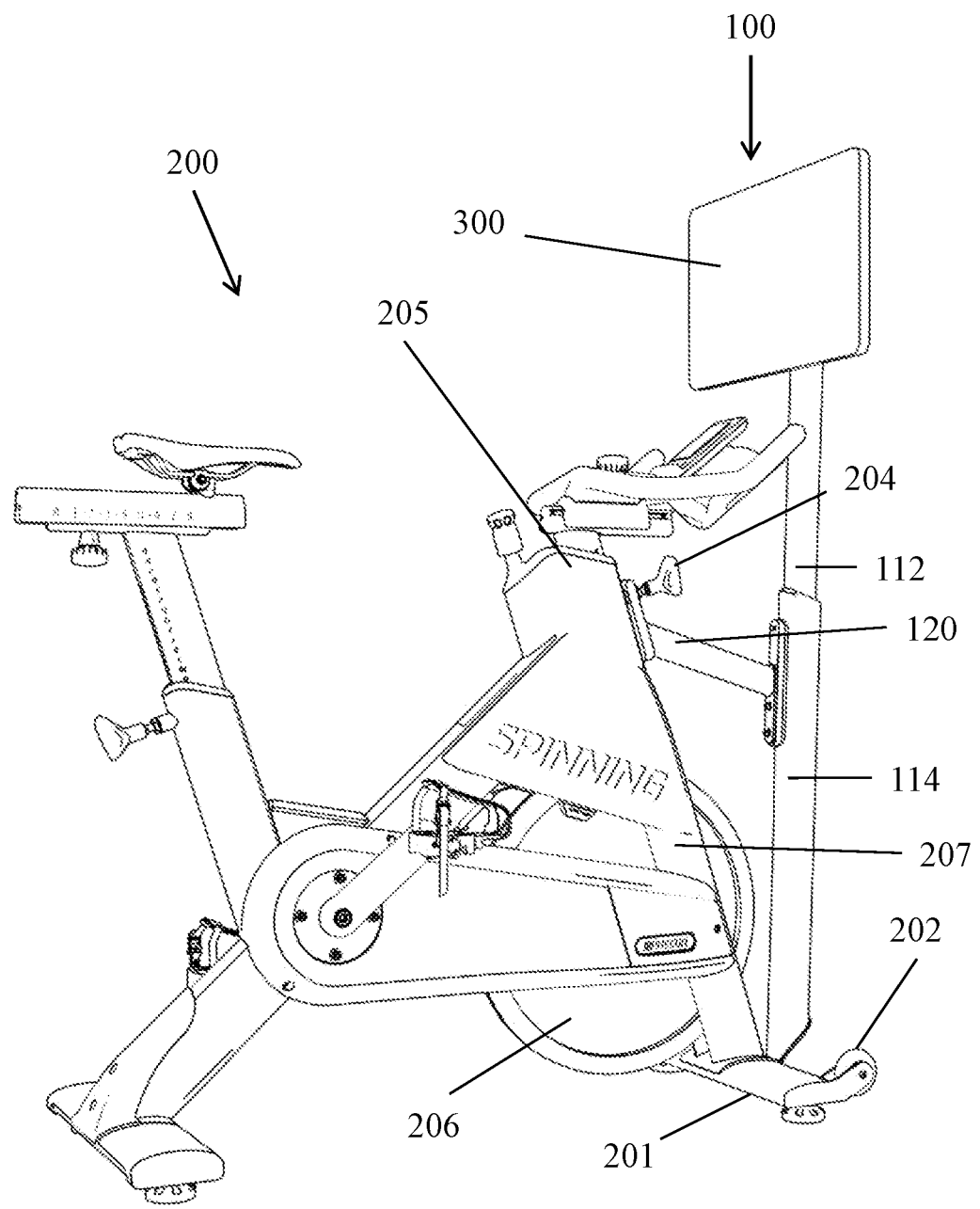
FIG. 3 is side view of the embodiment of FIG. 2.
Figure 4:
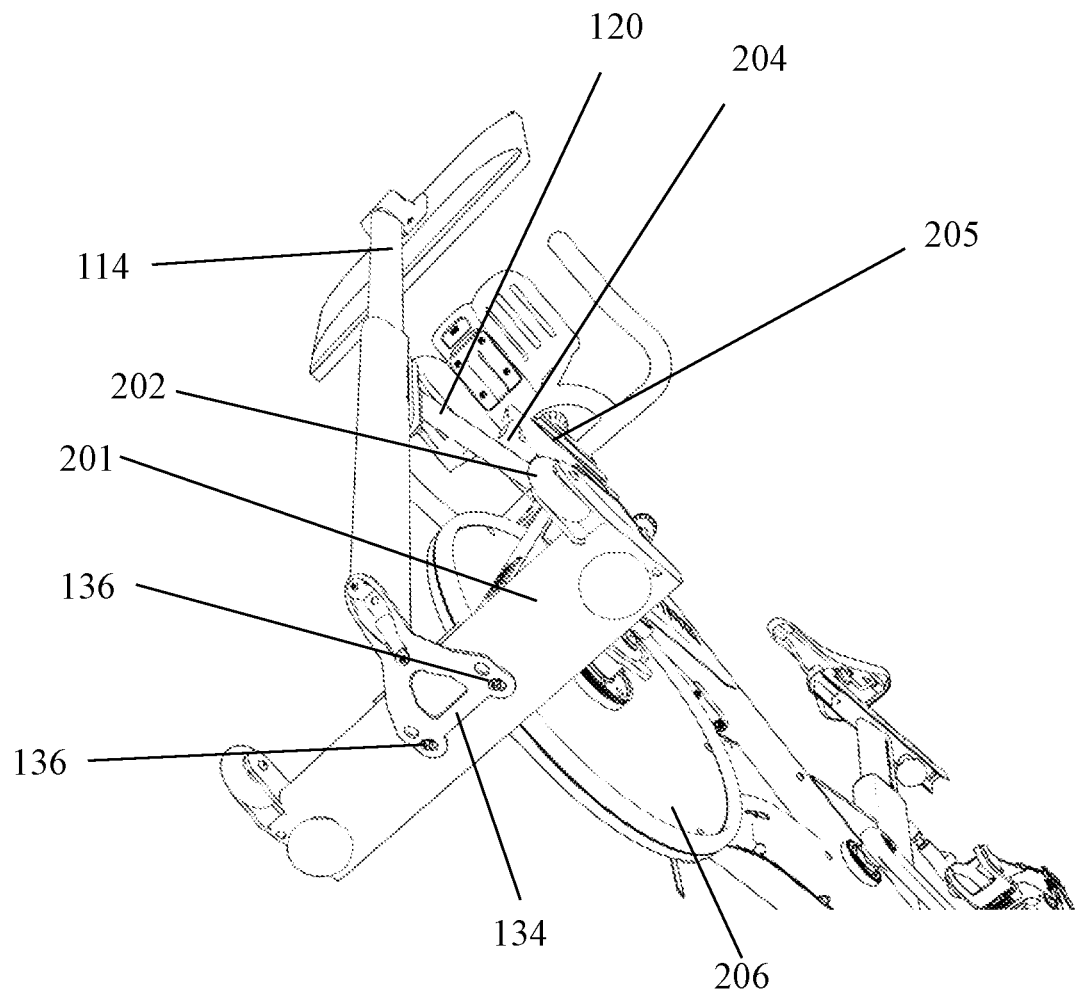
FIG. 4 is bottom view of the embodiment of FIG. 2.

Referring now to FIGS. 2-4, the screen stand 100 is retrofitted onto a stationary bicycle 200 without the need to modify or drill mounting holes in the stationary bicycle. Here, when the screen stand 100 is retrofitted onto the stationary bicycle 200, a user can still move the stationary bicycle 200 easily on the front transport wheels 202 by holding the top mast 112 and tilt the stationary bicycle 200 forward on the front stabilizer bar 201. The screen stand 100 can be safely and securely anchored the stationary bicycle 200. By having the screen stand 100 secured to the stationary bicycle 100, there is provided a desirable reach for the users.

In FIG. 2, a monitor 300 can be fastened onto the mounting bracket 105 using known fasteners 106 such as screws. The mounting bracket 105 can be coupled to the top mast 112 via a joint piece 103 thereby allowing the mounting bracket 105 to pivot relative to the top mast 112. In this way, a user can tilt the angle of the monitor 300 when needed. In other embodiments, the joint piece 103 may also allow a swiveling action thereby allowing user to rotate the monitor 300 from a landscape view to a portrait view when needed.

The contemplated screen stand 100 can utilize any known type of monitor or tablet holder as mounting bracket 105 to accommodate many different sizes of electronic displays 300.

Note that in this particular embodiment, the first anchor 120 of the bottom mast 114 is not anchored to the handlebars of the stationary bicycle 200. This allows the user to freely adjust the height of the handlebar without affecting the position of the monitor 300.

The first attachment point 122 of the first anchor 120 can be designed to attach to a portion of the stationary bicycle 200 at below the handlebar. For example, the first attachment point 122 in FIG. 2 is attached to the handle post 205 and is secured in place by the already existing pop pin 204. Pop-pins generally have the same diameter from manufacturer to manufacturer and there can be provided spacers or inserts to accommodate any variant in pop-pin weldment size.

In some other embodiments, the first anchor 120 can secure onto the stationary bicycle 200 in other ways without using the pop-pin and pop-pin weldment. For example, the first anchor 120 may use other fastening means such as belt clamps or strap clamps to secure onto the frame of stationary bicycle 200.

The contemplated second anchor 130 can be secured to the front stabilizer bar 201 of the stationary bicycle 200. As shown in FIG. 4, it can use the two existing bolts 136 at the bottom of the front stabilizer bar 201 for anchoring. The second anchor 130 can have a plate 134 having two corresponding through holes to receive the two existing bolts 136. When dealing with stationary bicycles 200 that may have bolts 136 located at different locations or spaced apart differently, there can be provided adaptors to accommodate this difference and still allow the second anchor 130 to attach to the front stabilizing bar 201 using preexisting bolts 136.

For stationary bicycles 200 that may not have any bolts at the stabilizer bar 201, the contemplated screen stand 100 may have belt or strap clamps (not shown) to anchor itself to the stabilizer bar 201 or to the fork 207 of the stationary bicycle 200.

In some embodiments, the bottom mast 114 can have a length longer than the diameter of the fly wheel 206, but the disclosure is not limited thereto.

In some embodiments, the distance between the first attachment point 122 (see FIG. 5) and the second attachment point 132 (see FIG. 5) is longer than the diameter of the fly wheel 205, but the disclosure is not limited thereto.

In other embodiments, the first attachment point 122 is located above the axle of the fly wheel 206, but the disclosure is not limited thereto.

In other embodiments, the second attachment point 132 is located below the axle of the fly wheel 206, but the disclosure is not limited thereto.

While many of the embodiments discussed above provides a top mast 112 adjustably moveable and slidably received within a bottom mast 114, there is contemplated an embodiment where there is only one single mast 110 that is not length- or height-adjustable. Such would be a simplified version having a single mast 110. Such single mast 110 can have a length of about the height of the stationary bicycle 200. In other embodiments, the single mast 110 can have a length longer than the height of the stationary bicycle 200.

In one embodiment, the screen stand 100 does not touch the ground when fully installed onto the stationary bicycle 200. In some embodiments, the screen stand 100 does not have a large base and creates minimal or no footprint.

The power cord of the monitor 300 or other media cables meant to be attached to the monitor 300 can be routed within the hollow body of the top and bottom mast 112, 124. There can be provided openings at the top and bottom of the mast 110 so a use may pass these cords and cable into and out of the hollow body of the mast 110.

Figure 5:
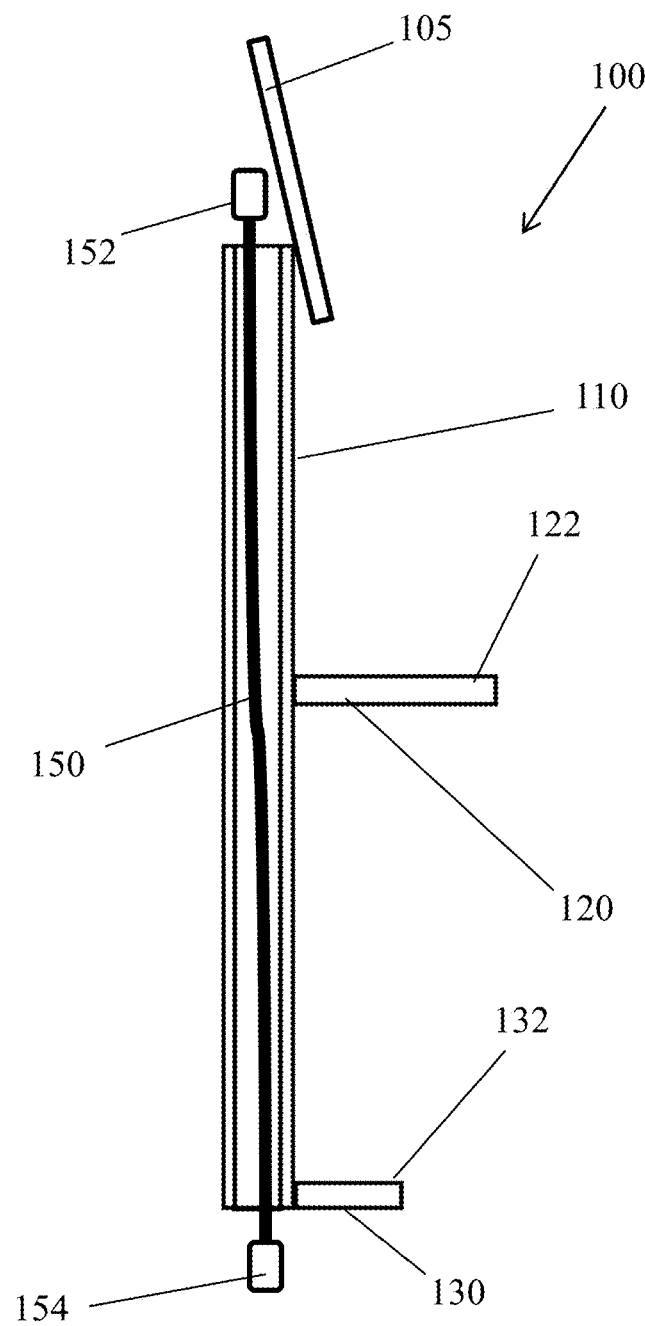
FIG. 5 is simplified cross-sectional illustration of one embodiment of the contemplated screen stand having a hollow mast within which is a bundle of cables hidden from view.

As shown in FIG. 5 is another embodiment where the power cords and cables 150 can be preassembled into the mast 110 to save the trouble of having to route cords and cables. In this way, a user may simply install the monitor 300 onto the mounting bracket 105 and plug in the connectors 152 of the reassembled cords and cable to the back of the monitor 300. The bottom end of the cords and cables can extend through the bottom end of the mast 120 and can have another connector 154. The user can then attach this connector 154 to the power source and media source using known extension cords/cables. In some models of stationary exercise machines, the user can plug the connector 154 into corresponding receiving plugs on the stationary exercise machines to allow data transmission. A user can freely wheel away the stationary bicycle 200 and screen stand 100 combination when the connector 154 is disconnected from any power or media extension cords/cables.

In some embodiments, the monitor 300 can wirelessly receive data (e.g., power and cadence, heart rate, integrated metrics) from the stationary bicycle 200 via ANT+ signals or other wireless communication protocols.

In addition, there can be multiple power outlets (not shown) provided on the mast 110 of the screen stand 100 so that it can accommodate many devices that require power.

Further contemplated is a self-contained modular rechargeable battery pack (not shown) to fit inside or on the mast 110 for a completely mobile power solution.

Optionally, the screen mount can have built-in or modular items attached to it such as a fan, device charging ports, storage shelves, hooks, breathing protection, bio-neutralizers and other sensors. Breathing protection can be done by having a plastic or inflatable "breathing cocoon" (not shown) attached to the screen stand 100 that can keep the rider's breath contained within the limits of the plastic shield.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a screen stand have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

What is claimed is:

1. A screen stand configured to secure onto a stationary exercise machine, the screen stand comprising:
    a mast;
    a mounting bracket to which a monitor can be attached to, said mounting bracket is disposed near a top end of the mast;
    a first anchor coupled to the mast, the first anchor has a first attachment point to attach to the stationary exercise machine;
    a second anchor coupled to the mast at a location below the first anchor, the second anchor has a second attachment point to attach to the stationary exercise machine, and
    wherein when the second attachment point is attached to the stationary exercise machine, the screen stand does not make physical contact with a ground.

2. The screen stand as recited in claim 1, wherein the mast includes a top mast and a bottom mast, said top mast slidably attaches to the bottom mast thereby allowing the mast to change its length.

3. The screen stand as recited in claim 1, wherein the mounting bracket is attached to the mast via a joint, and the joint provides a pivoting and/or swiveling movement for the mounting bracket relative to the mast.

4. The screen stand as recited in claim 3, wherein the mast has a hollow interior.

5. The screen stand as recited in claim 4 further comprising a cable and/or a power cord pre-assembled within the hollow interior of the mast.

6. The screen stand as recited in claim 5, wherein a top terminal end and a bottom terminal end of the cable and/or power cord are respectively extended through a top opening and a bottom opening of the mast.

7. The screen stand as recited in claim 6 further comprising a connector coupled to the bottom terminal end of the cable and/or power cord, wherein the connector allows electrical extension coupling to another cable and/or another power cord.

8. The screen stand as recited in claim 1, wherein the first attachment point is attached to a pop pin of the stationary exercise machine.

9. The screen stand as recited in claim 1, wherein the second attachment point is attached to a stabilizer bar of the stationary exercise machine.

10. The screen stand as recited in claim 1, wherein the stationary exercise machine is a stationary bike.

* * * * *